J. B. WISMER.
AXLE NUT.
APPLICATION FILED APR. 8, 1910.
975,189.
Patented Nov. 8, 1910.
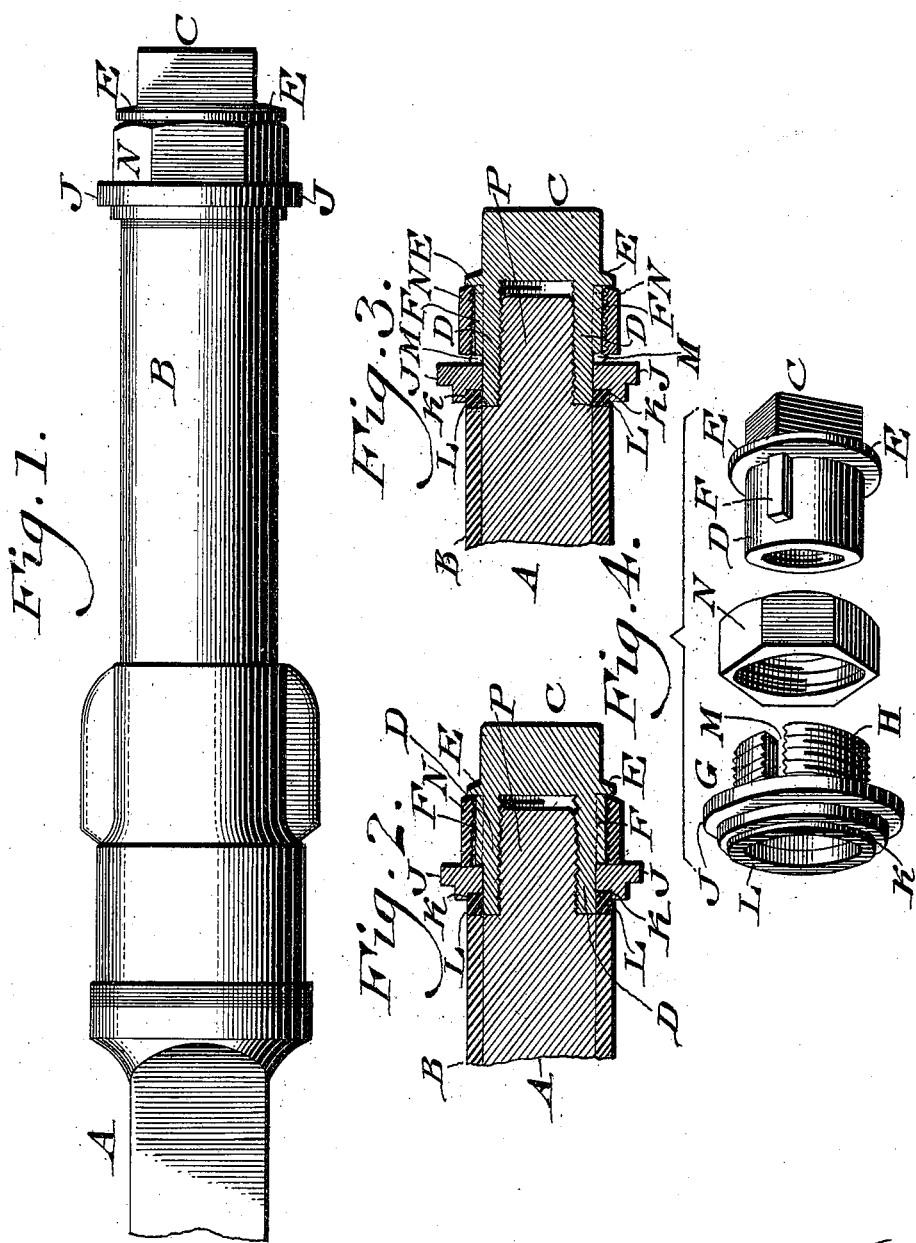
WITNESSES
INVENTOR
Joseph B. Wismer
BY
Niedersheim + Fairbault
ATTORNEYS

UNITED STATES PATENT OFFICE.

JOSEPH B. WISMER, OF FRANCONIA, PENNSYLVANIA.

AXLE-NUT.

975,189.     Specification of Letters Patent.     Patented Nov. 8, 1910.

Application filed April 8, 1910. Serial No. 554,116.

*To all whom it may concern:*

Be it known that I, JOSEPH B. WISMER, a citizen of the United States, residing at Franconia, in the county of Montgomery, State of Pennsylvania, have invented a new and useful Axle-Nut, of which the following is a specification.

My invention consists of an axle nut embodying a nut which is attachable to an axle, a sleeve having a member adapted to enter said nut and be interlocked therewith while capable of sliding motions thereon, and a rotatable collar which is adapted to engage said sleeve and have a bearing on said nut, so as to be capable of advancing said sleeve against the wheel, hub or box, and so provide for lost motion, wear and tear, and prevent rattling of the wheel on the axle, the novel features of the device being pointed out in the claims.

For the purpose of explaining my invention the accompanying drawing illustrates a satisfactory reduction of the same to practice, but the important instrumentalities thereof may be varied, and so it is to be understood that the invention is not limited to the specific arrangement and organization shown and described.

Figure 1 represents a side elevation of an axle nut embodying my invention, including a wheel box and portion of an axle. Figs. 2 and 3 represent longitudinal sections showing certain members in different positions therein. Fig. 4 represents a perspective view of the members of the device, in separate condition.

Similar letters of reference indicate corresponding parts in the figures.

Referring to the drawings:—A designates an axle, and B designates the box of a wheel thereon.

C designates a nut which consists of a neck or tubular body D which is interiorly threaded and has on its outer surface between its head and said body, the out-turned flange E, said head being adapted to have a wrench or other tool applied thereto for operative purposes. On the exterior of the neck D are splines or tongues F which project outwardly therefrom and extend in the longitudinal direction thereof.

G designates a sleeve which consists of a tubular body H, which is exteriorly threaded and has on one end the out-turned circumferential flange J, and on the inner side of said end the recess K in which is seated the gasket or packing L. In the wall of the body H are longitudinally extending recesses or passages M which are adapted to receive the spline F whereby the nut and sleeve may be coupled so as to be rotated as one, while the sleeve may slide on the nut for purposes to be explained hereinafter.

N designates a collar which is interiorly threaded and adapted to engage with the threads of the body H of the sleeve G, it being noticed that the threads of said body and collar are left handed, and that said collar freely envelops the splines F, the latter being unthreaded.

The operation is as follows:—The collar N is screwed upon the sleeve G and the body D of the nut C inserted in the body H of the sleeve G, the splines F entering the passages M. The nut with the sleeve and collar thereon is now screwed to the neck P of the axle, the packing or gasket L tightening against the end of the box, thus properly retaining the wheel on the axle. Should the wheel wear loose or wabble, the collar N is rotated in a reverse direction or backward whereby it bears against and swivels on the flange E, and turns in the threads of the body H of the sleeve G, in such manner that the latter is advanced toward the end of the box B and tightened against the same, thus taking up the lost motion, wear and tear thereof, without disturbing the nut, as will be apparent on reference to Fig. 3.

Having thus described my invention what I claim as new and desire to secure by Letters Patent, is:—

1. In an axle nut, an internally threaded nut formed with an annular flange and an externally smooth neck, an externally threaded and internally smooth sleeve fitted to slide upon the neck of the nut and having an annular flange, said nut and sleeve having means for permitting longitudinal and preventing rotary relative movement, and an internally threaded collar upon the threaded sleeve and engaging the flange of the nut.

2. In an axle nut, an internally threaded nut formed with an annular flange and an externally smooth neck having a longitudinal spline, an externally threaded and internally smooth sleeve fitting to slide upon the neck of the nut and formed with a longitudinal recess for the spline and with an annular flange, and an internally threaded collar upon the threaded sleeve and bearing against the flange of the nut.

JOSEPH B. WISMER.

Witnesses:
B. D. ALDERFER,
MENNO D. WISMER.